(12) United States Patent
Abel et al.

(10) Patent No.: US 9,703,539 B2
(45) Date of Patent: Jul. 11, 2017

(54) VIRAL APPLICATION DISTRIBUTION

(75) Inventors: Miller T. Abel, Mercer Island, WA (US); Joseph Futty, Sammamish, WA (US); James Kai Yu Lau, Bellevue, WA (US); Shai Guday, Redmond, WA (US); Richard Yuqi Yao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 12/916,374

(22) Filed: Oct. 29, 2010

(65) Prior Publication Data

US 2012/0110568 A1    May 3, 2012

(51) Int. Cl.
G06F 9/445    (2006.01)

(52) U.S. Cl.
CPC ...................... G06F 8/61 (2013.01)

(58) Field of Classification Search
CPC ........................................... G06F 8/61
USPC .................. 717/177, 178, 176; 714/177, 178
See application file for complete search history.

(56) References Cited

U.S. PATENT DOCUMENTS

| 7,427,926 B2 | 9/2008 | Sinclair et al. |
| 7,792,913 B2* | 9/2010 | Chen .............................. 709/206 |
| 7,818,811 B2 | 10/2010 | Kirovski et al. |
| 8,484,347 B1* | 7/2013 | Gostev et al. ................. 709/225 |
| 2003/0110094 A1 | 6/2003 | Gulliver et al. |
| 2005/0055386 A1* | 3/2005 | Tosey ........................... 707/204 |
| 2005/0216548 A1 | 9/2005 | Wormington et al. |
| 2006/0048141 A1* | 3/2006 | Persson et al. ................ 717/176 |
| 2006/0101454 A1* | 5/2006 | Whitehead ............ G06F 21/121 717/168 |
| 2008/0059992 A1 | 3/2008 | Amidon et al. |
| 2008/0133650 A1* | 6/2008 | Saarimaki ................. G06F 8/65 709/203 |
| 2010/0030578 A1* | 2/2010 | Siddique et al. ................. 705/3 |

(Continued)

FOREIGN PATENT DOCUMENTS

WO    WO2009156995 A1    12/2009

OTHER PUBLICATIONS

Anderson, "Adobe's new social platform for ads and apps"; retrieved on Jul. 23, 2010 at <<http://www.itwriting.com/blog/1801-adobes-new-social-platform-for-ads-and-apps.html>>, Sep. 21, 2009, pp. 1-4.

(Continued)

*Primary Examiner* — Andy Ho
(74) *Attorney, Agent, or Firm* — Lee & Hayes, PLLC (57) ABSTRACT

Viral application distribution facilitates distribution of an application among users and increases likelihood of downloading the application by the users. A first device may receive information of an application from a second device through a short-range communication channel. The information may comprise identification information of the application without any personally identifiable information of the second device to protect privacy of a user of the second device. A version of the application that is compatible with the first device is determined by searching a catalog using the identification information of the application. The compatible version of the application may then be downloaded or obtained by the first device. Location-based viral distribution may also be performed between devices that visit a location, even at different times.

20 Claims, 6 Drawing Sheets

(56) References Cited

U.S. PATENT DOCUMENTS

2010/0153495 A1* 6/2010 Barger et al. ............... 709/203
2011/0153495 A1* 6/2011 Dixon .................. G06Q 20/10
  705/39
2011/0275358 A1* 11/2011 Faenger .................... 455/420

OTHER PUBLICATIONS

"Appidemic gives life to your application!", retrieved on Jul. 23, 2010 at <<http://www.code-flakes.com/2008_11_01_archive.html>>, Nov. 2008, pp. 1-3.

Location to Mobile, retrieved on Jul. 23, 2010 at <<http://www.ibs.com.jo/Theam/Bluetooth/FuturLink_Location2Mobile_EN.Pdf>>, Futurlink, 2009, pp. 1-4.

Neubauer, "Social Computing or Let the bots talk!", retrieved on Jul. 23, 2010 at <<http://blog.jayway.com/2009/09/01/social-computing-or-let-the-bots-talk/>>, Jayway Team Blog, Sep. 1, 2009, pp. 1-12.

* cited by examiner

VIRAL APPLICATION DISTRIBUTION

BACKGROUND

Mobile applications and application stores have become ubiquitous. Thousands of mobile applications have been developed for a variety of platforms such as Windows®, Android® and IOS® (i.e., Apple's mobile operating system). This large number of mobile applications provides a user a significant number of alternatives, but at the same time increases the burden of the user to determine which application is good and/or which application is most suitable for his/her needs. Rather than spending time and effort to research which application is good and which application is not, the user may simply rely on word of mouth from his/her friend to choose an application. For example, if his/her friend has an application, likes the application and shows the application to the user, the user may determine to obtain the application if he/she also likes it. If the user decides to obtain the application for his/her mobile device however, the user usually needs to search the Internet and/or one or more application stores in order to find a version of the application compatible with his/her device. This task is complicated even more if the user does not know or remember the name of the application for which he/she is searching. This undoubtedly causes inconvenience to the user.

SUMMARY

This summary introduces simplified concepts of viral application distribution, which is further described below in the Detailed Description. This summary is not intended to identify essential features of the claimed subject matter, nor is it intended for use in determining the scope of the claimed subject matter.

This application describes example embodiments of viral application distribution. In one embodiment, a first device receives information of an application from a second device through a short-range communication channel. The information of the application includes identification information of the application without any personally identifiable information. A version of the application that is compatible with the first device is determined by searching a catalog using the identification information of the application. The first device then may download or otherwise obtain the compatible version of the application.

In some embodiments, the information of the application may include an encrypted tuple comprising identification information of the application and identification information of the second device. The first device decrypts the encrypted tuple to obtain the identification information of the application. A version of the application that is compatible with the first device may then be determined by searching a catalog using the identification information of the application. The first device then may download or otherwise obtain the compatible version of the application.

In another embodiment, the first device and the second device may not be at the same location at the same time. The first device may store information of an application at a location associated with a data device at a first time. The data device may subsequently detect a presence of a second device in a vicinity of the location at a second time, which is later than the first time. In response to detecting the presence of the second device in the vicinity of the location, the data device may distribute the information of the application to the second device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, the large number of mobile applications has increased the burden of a user to identify and obtain useful applications. The user may therefore resort to word of mouth from his/her friends to obtain an application. If the user likes the application, the user needs to find an application store that provides the application and also supports his/her mobile device. This unavoidably causes inconvenience to the user. Moreover, the user may keep searching the Internet for the application without knowing that there is no compatible version of the application for his/her mobile device.

This disclosure describes viral application distribution, by which a user may receive information of an application from another user through proximal interaction. The interactions are proximal in location and may, but need not, be proximal in time.

Generally, a first device receives a reference of an application from a second device. In some implementations, the reference of the application may be transmitted from the second device to the first device through a short-range communication channel. Depending on circumstances of applying this viral application distribution, the reference may be transmitted in an encrypted form or in an unencrypted format. The reference may include identification information of the application such as Uniform Resource Identifier (URI) usable by the first device to identify the application and to find or download the application. The URI provides a unique identification of an application. In some implementations, the URI identifies the application without regard for the version or the platform of the application that is installed on the second device. In some implementations, the reference may be free of personally identifiable information of the second device. In some implementations, the application information (e.g., URI) may be sent along with encrypted device information of the second device (i.e., sending device) such as an operating platform of the second device, a version of the application installed, a device identifier, account information, or the like. The first device may determine a compatible version of the application based at least upon the identification information of the application. In one embodiment, the first device may further verify an authenticity of the second device if the second device is not within a predetermined proximity of the first device.

Additionally or alternatively, the first device may verify an authenticity of the second device if the second device does not communicate with the first device through a predetermined communication channel set by the first device, or does not transmit the reference of the application in a predetermined form of communication set by the first device. The first device may download or otherwise obtain the application upon determining the compatible version of the application.

In some embodiments, the application reference received from the second device may include an encrypted tuple associated with the application. The encrypted tuple may include identification information of the application. The encrypted tuple may further include identification information of the second device and/or a user of the second device. The first device may decrypt the encrypted tuple, and obtain the identification information of the application. In an event that the encrypted tuple includes identification information of the second device and/or a user of the second device, the first device may further obtain the identification information of the second device and/or the user of the second device after decryption. In one embodiment, the identification information of the second device and/or the user of the second device may be encrypted in an encryption algorithm and/or encryption key different from that for the identification information of the application, e.g., a public key of an application store that is associated with the second device. In this case, the first device may obtain the identification information of the application only without knowing or obtaining the identification information of the second device and/or the user of the second device.

By transmitting a reference of an application between a sending device and a recipient device, a user of the recipient device is saved from searching the Internet for the application. Furthermore, if an operating platform of the sending device is different from an operating platform of the recipient device, transmitting the reference of the application allows the recipient device to find a compatible version of the application without any input or intervention of the user of recipient device.

In another scenario, a service provider such as a restaurant, a retail store or a public transit, may write a service-specific application to help its customers to get the most out of its offered service. For example, a restaurant may want to provide an application to its customers who have an Android® phone or Windows® phone automatically. However, existing technologies require its customers to perform a manual search and to locate either the restaurant's website or an application store in order to download the application. This therefore imposes undesired burden on the customers, discouraging the customers from using the application.

In one embodiment, a third device such as a data device may be involved in the viral application distribution. A first device may plant an application reference or executable code of an application to the data device when the first device is in a vicinity of a specific location that is associated with the data device at a first time. The data device may then store the application reference or the executable code of the application with or without verifying content of the application reference or the executable code of the application, such as whether the application reference or the executable code of the application includes any malicious code. The data device may later detect a presence of a second device in the vicinity of the location at a second time. Upon detecting the presence of the second device in the vicinity of the location, the data device may distribute a portion or all of the application reference or the executable code of the application to the second device. In some embodiments, an owner or operator of the data device may directly plant an application reference or executable code of an application to the data device, which may then be distributed to any device described above.

Multiple and varied implementations and embodiments are described below. In the following section, an exemplary environment that is suitable for practicing various implementations is described. After this discussion, illustrative implementations of systems, devices, and processes for viral application distribution are described.

Exemplary Architecture

Figure 1:
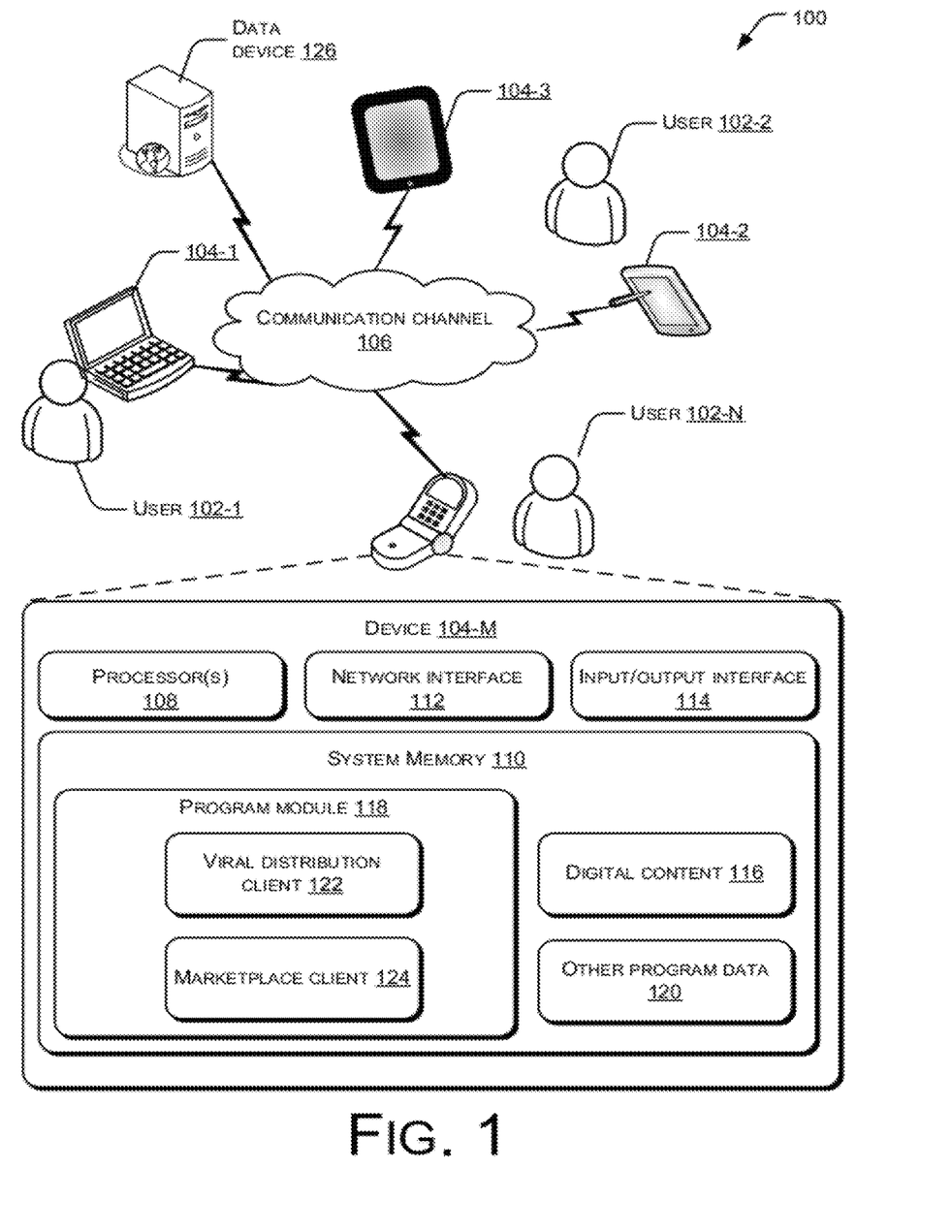
FIG. 1 illustrates an exemplary environment including an example viral application distribution.

FIG. 1 illustrates an exemplary environment 100 usable to implement an example viral application distribution. The environment 100 includes one or more users 102-1, 102-2, ... 102-N (which are collectively referred to as 102), one or more devices 104-1, 104-2, 104-3, ... 104-M, which are collectively referred to as 104, and a communication channel 106.

The device 104 may be implemented as a variety of conventional computing devices including, for example, a server, a desktop PC, a notebook or portable computer, a workstation, a mainframe computer, a mobile computing device, a handheld device, a portable reading device, an eBook reader, a tablet computer, a television, a set-top box, a mobile phone, a PDA, a smart phone, a media player, a netbook, an Internet appliance, a network router, etc. or a combination thereof. The device 104 may further include any other mobile device that is applicable in the disclosed method and system of the present disclosure.

The communication channel 106 may be a wireless or a wired network, or a combination thereof. The communication channel 106 may be a collection of individual networks interconnected with each other and functioning as a single large network (e.g., the Internet or an intranet). Examples of such individual networks include, but are not limited to, telephone network, cable network, Local Area Networks (LANs), Wide Area Networks (WANs), and Metropolitan Area Networks (MANs). Further, the individual networks may be wireless or wired networks, or a combination thereof. In one embodiment, the communication channel 106 may include a short-range communication channel. Examples of a short-range communication channel include, but are not limited to, infrared communication, radio-frequency identification (RFID), Bluetooth, WiFi, WiFi Direct, ZigBee, infrared data association (IrDA), high-frequency modulated visible light and/or modulated audio. The short-range communication channel may further include near field communication (NFC) which is a short-range high frequency wireless communication technology enabling exchange of data between devices over a short distance, e.g., ten centimeters. NFC is a technology stack built on the four part ISO/IEC 14443 radio standard combined with ISO/IEC 18092.

In one embodiment, the device 104 includes a processor 108 coupled to a memory 110. The device 104 may further include a network interface 112 and an input/output interface 114. The memory 110 includes an application 116, program modules 118 and other program data 120. The memory 110 may be coupled to or associated with, and/or accessible to other devices, such as network servers, router, and/or other devices 104. The memory 110 includes a computer-readable media in the form of volatile memory, such as Random Access Memory (RAM) and/or non-volatile memory, such as read only memory (ROM) or flash RAM. The memory 110 is one example of computer-readable storage media. The application 116 may comprise any other content, including, but not limited to, a software application, a game, a virtual currency, a virtual goods, music and/or video.

In one embodiment, a first user (e.g., user 102-1) using a first device (e.g., 104-1) may receive an invitation from a second user (e.g., user 102-2) using a second device 104-2 to install the application 116 on the first device 104-1. Alternatively, the first user 102-1 may note the application 116 of the second device 104-2 of the second user 102-2 and want to install the application 116 on the first device 104-1. In some embodiments, the second user 102-2 is the same as the first user 102-1.

This disclosure describes several ways to facilitate this viral distribution of the application 116 from one device to another. According to one example, the second user 102-2 may instruct the second device 104-2 to transmit information of the application 116 to the first device 104-1 over the communication channel 106. In one embodiment, the application 116 on the second device 104-2 may provide a button or icon to allow the second user 102-2 send the information of the application 116 to other device. Alternatively, a folder may be designated in the memory 110 of the second device 104-2 for applications to be shared. When the second user 102-2 places the information of the application 116 or an icon of the application 116 to the designated folder, the second device 104-2 will be initiated for transmission of the information of the application 116. Additionally or alternatively, a viral distribution client 122 may be included in the second device 104-2 to facilitate distribution of the application 116 to other device(s).

In some embodiments, the second device 104-2 may beam the information of the application 116 to the first device 104-1 through a short-range communication channel such as Bluetooth and NFC. Additionally or alternatively, the second device 104-2 may send the information of the application 116 in a form of a SMS (i.e., short message service) message and/or an email.

In one embodiment, transmission of the information may be initiated by a detection of a bumping of the first device 104-1 and the second device 104-2 together as described in U.S. Pat. No. 7,427,926, issued on Sep. 23, 2008, which is assigned to the assignee of this application. In response to detecting a tapping/bumping with the second device 104-2 at the first device 104-1, the first device 104-1 may be ready or automatically initiated to receive the information of the application 116 from the second device 104-2. Additionally or alternatively, in response to detecting a tapping/bumping with the second device 104-2, the first user 102-1 may be prompted to initiate the transmission of the information.

In some embodiments, the information of the application 116 may include an application reference. The application reference may include identification information of the application 116. The identification information of the application 116 may include, but is not limited to, a unique global identifier of the application 116, a thumbnail image of the application 116, a barcode of the application 116, and/or a signature of the application 116. In some embodiments, the application reference may further include identification information of the second device 104-2 and/or second user 102-2, for example. The second user 102-2 may, however, be given an opportunity to opt out of sharing the identification information of the second device 104-2 and/or the second user 102-2. Additionally or alternatively, the second user 102-2 may opt out of sharing the identification information of the second device 104-2 and/or the second user 102-2 to the first user 102-1 or the first device 104-1 but allowing this identification information be provided to an application store associated with the application 116, for example. In this case, the identification information of the second device 104-2 and/or the second user 102-2 may be encrypted and decrypted using private and public keys of the second device 104-2 or the application store, for example.

The identification information of the second user 102-2 may include a name of the second user 102-2, contact information of the second user 102-2 such as a phone number, and/or a username of the second user 102-2. The identification information of the second device 104-2 may include, but is not limited to, an identifier of a device type of the second device 104-2 (e.g., Windows® device), an operating platform of the second device 104-2, a version of the application 116 installed on the second device 104-2, etc.

Depending on uses and circumstances of the application 116, the application reference may be prepared and/or transmitted in an encrypted form or in an unencrypted format. In one embodiment, the application reference may comprise an encrypted tuple including identification information of the application 116 in an encrypted form. Additionally, the encrypted tuple may further include identification information of the second user 102-2 or the second device 104-2 in an encrypted form. In some embodiments, the identification information of the application 116 and the identification information of the second user 102-2 or the second device 104-2 may be encrypted differently, e.g., using different encryption algorithms and/or encryption keys.

In one embodiment, the application reference may include identification information of the application 116 without any personally identifiable information. In another embodiment, the application reference may include identification information of the application 116 and personally identifiable information of the second device 104-2 and/or the second user 102-2. The personally identifiable information of the second device 104-2 and/or the second user 102-2, however, may be encrypted, and cannot be decrypted by the first device 104-1. For example, the personally identifiable information of the second device 104-2 and/or the second user 102-2 may be encrypted by a public encryption key of an application store or a website facilitating rewarding a recommender of the application 116. This encrypted personally identifiable information may be previously obtained by the second user 102-2 when the second user 102-2 downloads the application 116 from the application store, the website or another application store or website that is affiliated with the rewarding application store or website onto the second device 104-2. Alternatively, the second device 104-2 may receive this encrypted personally identifiable information when the second user 102-2 registers to be a recommender of the application 116 at the rewarding application store or website, or affiliated application store or website.

Although the information of the application 116 is described being sent from the second device 104-2 to the first device 104-1 over the communication channel 106, the present disclosure is not limited thereto. In one embodiment, the second device 104-2 may display a visual signature of the application 116 on a screen thereof, and the first device 104-1 may capture the identification information of the application 116 through a camera on the first device 104-1 (not shown). In another embodiment, the second device 104-2 may display a barcode of the application 116 on the screen, and the first device 104-1 may read the barcode through a barcode reader or a scanner thereof (not shown).

Additionally or alternatively, the second device 104-2 may embed the identification information of the application 116 as a signature in modulated audio and play the modulated audio in a proximity of the first device 104-1. The first device 104-1 may capture the modulated audio through a microphone (not shown) and analyze the modulated audio to extract the embedded signature of the application 116.

Additionally or alternatively, the second device 104-2 may embed the identification information of the application 116 as a signature in modulated visible light and emit the modulated visible light through one or more emitters (not shown) such as a panel light, LED or camera flash illuminator on the second device 104-2, or by modulating a display or display backlight of the second device 104-2 (not shown) in aligned proximity to the first device 104-1. The first device 104-1 may capture the modulated visible light through one or more detectors or sensors (not shown) such as a light detector such as a photodiode, spectrally sensitive detector, LED configured as visible light detector, ambient light detector, or through a digital camera sensor (not shown) to extract the embedded signature of the application 116. For example, the second device 104-2 may be a television and an emitter thereof may be a television screen. The first device 104-1 may be a mobile device with a camera thereof as a detector.

In some embodiments, before or after receiving the information of the application 116, the first device 104-1 may determine whether to verify an authenticity of the second device 104-2 and/or the second user 102-2. In one embodiment, the first device 104-1 may determine whether to verify an authenticity of the second device 104-2 or the second user 102-2 based upon whether a tapping/bumping with the second device 104-2 is detected at the first device 104-1. Additionally or alternatively, the first device 104-1 may determine whether to verify an authenticity of the second device 104-2 or the second user 102-2 based upon whether the second device 104-2 is within a predetermined proximity of the first device 104-1, for example, within a normal interaction distance such as within five feet. This may be useful to help ensure that any application and/or information of an application being transferred to a user's device is coming from a known/anticipated source.

In one embodiment, proximity or distance between the second device 104-2 and the first device 104-1 may be determined based upon signal strength of the communication channel used between the first device 104-1 and the second device 104-2. Additionally or alternatively, proximity or distance between the first device 104-1 and the second device 104-2 may be determined by measuring signal exchange delay or latency between the two devices. Additionally or alternatively, proximity or distance between the second device 104-2 and the first device 104-1 may be determined based upon a type of the communication channel used between the first device 104-1 and the second device 104-2. For example, NFC radio signal propagation may be limited to a few centimeters (e.g., less than ten centimeters). If the first device 104-1 and the second device 104-2 are communicated through the infrared communication, the first device 104-1 may determine that the second device 104-2 is in a proximity of the first device 104-1. Although exemplary methods of determining whether the second device 104-2 is in a proximity of the first device 104-1 are given above, the present disclosure is not limited thereto. The present disclosure covers any method that can determine whether the second device 104-2 is in a proximity of the first device 104-1 for the purpose of viral application distribution. For example, the first device 104-1 may determine a proximity of the second device based upon analyzing GPS signal of the second device 104-2. The GPS signal of the second device 104-2 may be communicated to the first device 104-1 by, for example, receiving a notification from a location service to which both the first and second device subscribe (e.g., Foursquare®, Loopt®, etc.).

In one embodiment, if a tapping/bumping with the second device 104-2 is received at the first device 104-1 or the second device 104-2 is within a predetermined proximity of the first device 104-1, the first device 104-1 may determine to receive or accept the information of the application 116 without verifying the authenticity of the first device 104-2. In another embodiment, if no tapping/bumping with the second device 104-2 is received at the first device 104-1 or the second device 104-2 is outside a predetermined proximity of the first device 104-1, the first device 104-1 may determine to verify the authenticity of the second device 104-2. In some embodiments, the first device 104-1 may send a verification message to the second device 104-2 for verification. Upon affirmative verification of the authenticity of the second device 104-2, the first device 104-1 may receive or accept the information of the application 116 from the second device 104-2. In some embodiments, if the first device 104-1 cannot verify the authenticity of the second device 104-2, the first device 104-1 may try to perform verification of the second device 104-2 again. Alternatively, the first device 104-1 may indicate to the first user 102-1 that verification of the authenticity of the second device 104-2 is not successful and wait for instruction from the first user 102-1 as to whether to proceed anyway or reject the information of the application 116 from the second device 104-2 or communication with the second device 104-2.

In some embodiments, before and/or after receiving the information of the application 116 from the second device 104-2, the first device 104-1 prompts the first user 102-1 to confirm communication with the second device 104-2 for security purpose. Only if the first user 102-1 confirms communication with the second device 104-2 will the first device 104-1 accept or receive any information such as the information of the application 116 from the second device 104-2. This prevents unintentional tapping or communication with other device 104 of a malicious user, for example, thereby preventing the malicious user from sending malicious information to the first device 104-1.

In one embodiment, upon receiving the information of the application 116, if the information of the application 116 is encrypted, e.g., in a form of an encrypted tuple, the first device 104-1 may decrypt the encrypted information of the application 116 to obtain relevant information such as the identification information of the application 116 and/or the identification information of the second device 104-2 when present. The information of the application 116 may be, for example, encrypted and decrypted using public and private keys of the first device 104-1 or the second device 104-2.

Additionally or alternatively, upon receiving the information of the application 116, the first device 104-1 may determine a version of the application that is compatible with the first device 104-1 based on the information of the application 116. Additionally or alternatively, the first device 104-1 may transmit the information of the application 116 to an application store, which determines the compatible version of the application 116. For example, the second device 104-2 may be a Windows® device and the first device 104-1 may be an Android® phone. A version of the application installed in the Windows® device may not be compatible with the Android® phone. For another example, the second device 104-2 may be a laptop computer and the first device 104-1 may be a Windows® device. A version of the application installed in the laptop computer may not be compatible with the Windows® device.

In one embodiment, the first device 104-1 may include a marketplace client 124 in the memory 110. The first device 104-1 may search a catalog provided by the marketplace client 124 to find a compatible version of the application 116 based on the information of the application 116 (such as identification information of the application 116). Upon searching the catalog, one or more compatible versions of the application 116 may be returned. The first user 102-1 may select one of the compatible versions of the application to download and install in the first device 104-1. For example, the first user 102-1 may select the latest compatible version of the application 116. Alternatively, the first device 104-1 may automatically select the latest version of the application 116 for download and installation.

In some embodiments, no compatible version of the application for the first device 104-1 may be found. In that case, the first user 102-1 may be notified that a compatible version of the application 116 does not exist. Alternatively, in one embodiment, upon finding no compatible version of the application 116 for the first device 104-1, the marketplace client 124 may automatically search the Internet to locate a compatible version of the application 116 and return the compatible version of the application 116 to the first device 104-1 without any input or intervention of the first user 102-1. Alternatively, the marketplace client 124 may ask the first user 102-1 whether he/she wants to search the Internet for a compatible version of the application 116. Upon receiving a positive indication from the first user 102-1, the marketplace client 124 may search the Internet to locate a compatible version of the application 116 and return the compatible version of the application 116 to the first device 104-1.

Alternatively, in the absence of a compatible version of the application 116, the search may return results of other similar compatible applications and/or web results for non-compatible version of the application 116 to the first device 104-1 for displaying to the first user 102-1.

In one embodiment, the catalog searched by the marketplace client 124 may be a catalog stored locally in the first device 104-1. The locally stored catalog may be updated on a regular basis, each week, for example. Additionally or alternatively, the catalog may include a catalog stored remotely in an application store or a server that provides support to an operating platform of the first device 104-1 or the first device 104-1 itself. For example, the first device 104-1 may be an iPhone®, and the application store may include iTunes® store. The marketplace client 124 may connect to the iTunes® store and search a catalog in the iTunes® store to locate a compatible version of the application 116 based at least upon the identification information of the application 116. The marketplace client 124 may further make use of general identification information of the first device 104-1 (such as a model type of the first device 104-1, iPhone® generation 4 and/or an operating platform of the first device 104-1, for example) to locate a compatible version of the application 116 in the catalog. In some embodiments, the marketplace client 124 of the first device 104-1 may be associated with a specific application store related to an operating platform of the first device 104-1, or a manufacturer or a service provider of the first device 104-1, and looks for applications that are particularly compatible with the first device 104-1 in that specific application store, manufacturer or service provider. For example, if the second device is a Windows® device, the marketplace client 124 of the second device may be associated with the Windows® Marketplace for searching applications. Additionally or alternatively, the marketplace client 124 may be associated with a third-party application store that provides support to various operating platforms such as Android®, Windows® and IOS®, various service providers, and/or various model types of the device 104.

Upon determining a compatible version of the application 116, the first device 104-1 may download the compatible version of the application 116. The first user 102-1 may then install the compatible version of the application 116 onto the first device 104-1. In one embodiment, in response to downloading or installing the compatible version of the application 116 into the first device 104-1, the first device 104-1 may receive a confirmation code or coupon code from either the compatible version of the application 116 or the application store. The first device 104-1 may subsequently send the confirmation code or coupon code to the second device 104-2. The second user 102-2 may redeem a reward or a credit from his/her application store (or the application store from which the compatible version of the application 116 for the first device 104-1 is downloaded) based upon this confirmation code or coupon code. Moreover, this confirmation code or coupon code can be used by the application store as a tracking record of how well/effective the second user 102-2 promotes the application 116 to other users 102.

Additionally or alternatively, the first device 104-1 may convey the identification information of the second device 104-2 and/or the second user 102-2 in an encrypted form to the application store along with an URI, thereby notifying the application store who has recommended/transferred the application 116 and/or the information of the application 116 to the first device 104-1. The application store may then directly send reward information to the second device 104-2 or another device of the second user 102-2 indicated in the identification information of the second user 102-2 based on the identification information of the second device 104-2 and/or the second user 102. For example, if the encrypted identification information of the second user 102-2 includes a mobile phone number of the second user 102-2, the application store may send a SMS message including a confirmation code or coupon code to the second user 102-2 at the mobile phone number.

Additionally or alternatively, the marketplace client 124 of the first device 104-1 may keep track of the application 116, whether the application 116 has been downloaded and/or installed in the first device 104-1. The marketplace client 124 may send a message to the application store from which the compatible version of the application 116 is downloaded, an application store with which a marketplace client 124 of the second device 104-2 is associated, and/or a third-party application store, to indicate whether the application 116 has been downloaded and/or installed in the first device 104-1. This can be performed automatically or upon approval from the first user 102-1. This allows the marketplace client 124 to track download and installation of the application 116.

In one embodiment, if the application 116 is a networked application such as a networked game, the identification information of the second user 102-2 may be incorporated into the compatible version of the application 116 that is downloaded and installed in the first device 104-1. This allows immediate invitation of the first user 102-1 to play the networked game with the second user 102-2. The identification information of the second user 102-2 may include limited account information of the second user 102-2 that allows the first user 102-1 to recognize the second user 102-2 in the networked game environment. Additionally or alternatively, a gamer list of the networked game in the second device 104-2 may also be included in the transmitted information of the application 116 to the first device 104-1.

In some embodiments, the compatible version of the application 116 downloaded to the first device 104-1 may include a free version, a trial version with expiration date, a limited version, or a full version of the application 116. The first user 102-1 may need to pay a fee in order to continuously use the application 116 or upgrade the application 116 to a full version. In another embodiment, the second user 102-2 may have purchased a number of copies of the application 116. The second user 102-2 may want to give one copy of the application 116 to the first user 102-1 by sending purchase information (which may or may not be included in the information of the application 116) to the first device 104-1.

Although the marketplace client 124 of the first device 104-1 (or a recipient device) is described to find the compatible version of the application 116 for the first device 104-1, the present disclosure is not limited thereto. In one embodiment, a marketplace client 124 of the second device 104-2 (i.e., a sending device) may determine a compatible version of the application 116 for the first device 104-1. The second device 104-2 may obtain information of the first device 104-1, such as an operating platform of the first device 104-1 and/or a model type of the first device 104-1, and may use this information to determine a compatible version of the application 116 for the first device 104-1. Upon determining a compatible version for the first device 104-1, the first device 104-2 may send to, the first device 104-1, an application reference which may include a specific URI to download the compatible version of the application 116. Alternatively, the second device 104-2 may download the compatible version of the application 116 for the first device 104-1, and transfer the downloaded version to the first device 104-1 through the communication channel 106. This allows a device having no Internet access to obtain the application 116.

FIG. 1 may optionally include a data device 126. The data device 126 may be implemented as a variety of conventional computing devices including, for example, a server, a desktop PC, a notebook or portable computer, a workstation, a mainframe computer, a mobile computing device, a handheld device, a mobile phone, an Internet appliance, a network router, etc. or a combination thereof.

Figure 2:
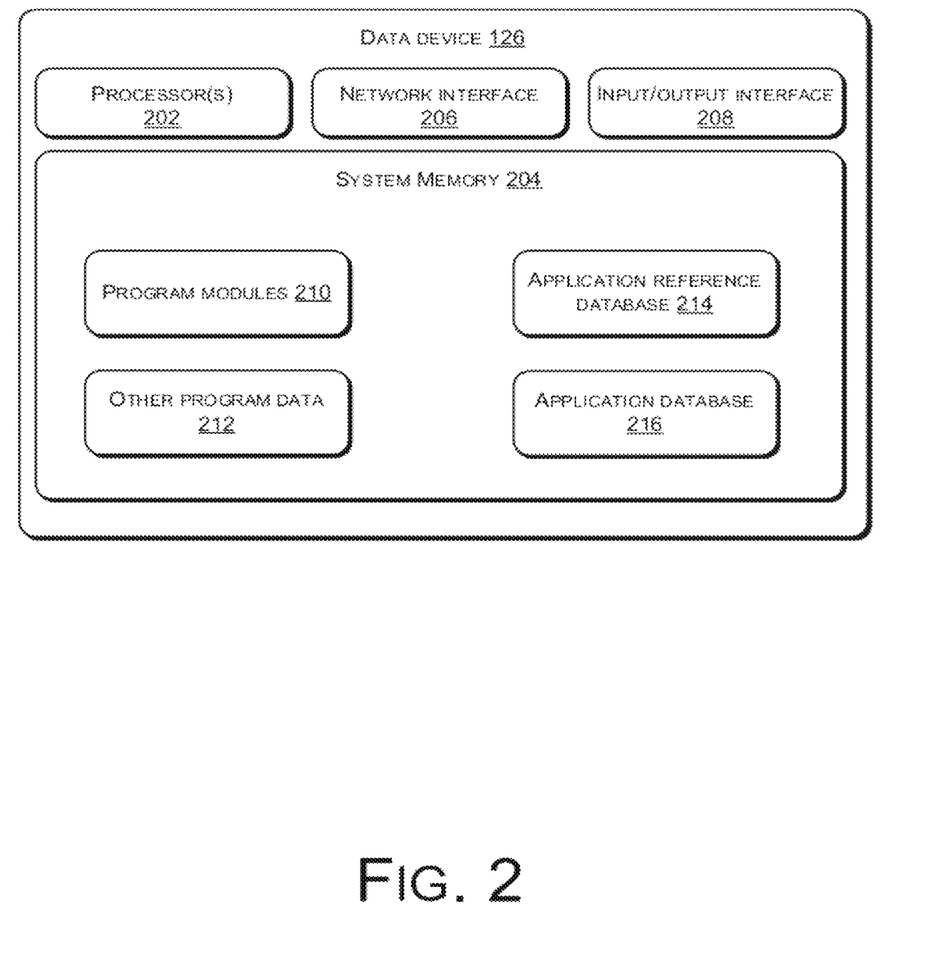
FIG. 2 illustrates an example data device of FIG. 1 in more detail.

FIG. 2 shows the example data device 126 of FIG. 1 in more detail. In one embodiment, the data device 126 may include a processor 202 coupled to a memory 204. The data device 126 may further include a network interface 206 and an input/output interface 208. The memory 204 may include program modules 210 and other program data 212. The memory 204 may further include an application reference database 214 and an application database 216. The application reference database 214 may store information of at least some applications that are planted in the data device 126. The application database 216 may store executable codes and/or contents of certain applications that are planted in the data device 126. The memory 204 may be coupled to or associated with, and/or accessible to other devices, such as network servers, router, and/or other devices 126. The memory 204 includes a computer-readable media in the form of volatile memory, such as Random Access Memory (RAM) and/or non-volatile memory, such as read only memory (ROM) or flash RAM. The memory 204 is one example of computer-readable storage media.

In addition to or alternative of the foregoing embodiments regarding viral application distribution between two devices, a third device such as the data device 126 may be involved in the distribution. In one embodiment, a user (e.g., user 102-1) using a first device (e.g., device 104-1) may request to plant an application reference of an application 116 into the data device 126. The user 102-1 may tap/bump the first device 104-1 with a device at a location associated with the data device 126 to initiate the request. The device at the location associated with the data device 126 may include the data device 126 or another device such as a detector or kiosk.

Additionally or alternatively, the user 102-1 may broadcast a presence of the first device 104-1 in a vicinity of the location associated with the data device 126 through the communication channel 106. In one embodiment, the data device 126 may be proximal to the location. In another embodiment, the data device 126 may be remote to the location, and a detector or a kiosk that is deployed in the location may transmit information to the data device 126 remotely. Upon detecting the tapping/bumping with the first device 104-1 or the presence of the first device 104-1 in the vicinity of the location, the data device 126 may be initiated to exchange or receive information from the first device 104-1.

In one embodiment, the data device 126 may receive information of the application 116 that the first device 104-1 requests to plant through the communication channel 106 at a first time. The information of the application 116 may include any of the information described in the above embodiments, such as an application reference.

In some embodiments, in response to receiving the information of the application 116 from the first device 104-1, the data device 126 may verify the information of the application 116 to be free of malicious code and/or information. Upon verifying that no malicious code or information is included in the received information of the application 116, the data device 126 may store the information of the application 116. In one embodiment, the data device 126 may further receive information of the first device 104-1 or the user 102-1 of the first device 104-1. For example, the data device 126 may receive a contact list or buddy list of the user 102-1 that is stored in the first device 104-1. The data device 126 may further store the information of the first device 104-1 or the user 102-1 of the first device 104-2 in association with the information of the application 116. The information of the first device 104-1 may include any of the identification information of a device described in the above embodiments, such as an identifier of a device type.

In some embodiments, the data device 126 may detect a presence of a second device (e.g., device 104-2) in a vicinity of the location at a second time, which is later than the first time. The data device 126 may detect the presence of the second device 104-2 by detecting a tapping/bumping with the second device 104-2, and/or detecting its presence in the communication channel 106. Additionally or alternatively, the data device 126 may detect the presence of the second device 104-2 by receiving and/or analyzing GPS signal of the second device 104-2 (e.g., via a location service such as Foursquare®, Loopt®, etc. In one embodiment, in response to detecting the presence of the second device 104-2 in the vicinity of the location, the data device 126 may distribute at least a portion of the information of the application 116 to the second device 104-2. The portion of the information of the application 116 distributed to the second device 104-2 may include an application reference without any personally identifiable information, e.g., of the first device 104-1.

In another embodiment, the data device 126 may determine whether the second device 104-2 is included in a contact list or buddy list that is associated with the information of the application 116. If the second device 104-2 is found to be included in the contact list or buddy list associated with the information of the application 116, the data device 126 may then distribute the information of the application 116 such as an application reference to the second device 104-2. In some embodiments, the data device 126 may further indicate to the second device 104-2 or a user of the second device (e.g., 102-2) that the application 116 is planted by his/her friend—the user 102-1. If the second device 104-2 is not included in the buddy list associated with the information of the application 116, the data device 126 may or may not distribute the information of the application 116 to the second device 104-2.

In still another embodiment, the data device 126 may receive a wish list of applications from the second device 104-2. The data device 126 may determine whether the application 116 is within the received wish list of applications from the second device 104-2. In one example, when the first user 102-1 plants the application 116, the second user 102-2 may be notified by, e.g., email, SMS message, etc, which may create an entry in the wish list for the application 116 on the second device 104-2 automatically or manually by the second user 102-2 upon prompt. In response to determining that the application 116 is within the received wish list of applications from the second device 104-2, the data device 126 may distribute the information of the application 116 to the second device 104-2. Alternatively, if determining that the application 116 is not within the received wish list of applications from the second device 104-2, the data device 126 may or may not distribute the information of the application 116 to the second device 104-2.

Additionally or alternatively, the data device 126 may impose a temporal restriction on planting an application. For example, the information of the application 116 planted in the data device 126 may be expired after a predetermined period of time, e.g., one week, one month, one year, etc. Additionally, different planted information of applications may have different expiration periods/durations. Furthermore, a user who plants information of an application may be allowed to set an expiration date for the information. In one embodiment, the expiration date of the information of the application may be updated or postponed by a certain time period in an event that a certain number of devices download the information of the application from the data device 126.

Additionally or alternatively, the data device 126 may itself act like a sending device as in the first example of viral application distribution of FIG. 1. For example, the data device 126 may belong to a restaurant. An owner or operator of the restaurant may want to distribute a specific application to his/her customers who have an Android® phone or Windows® phone automatically. The owner of the restaurant may then store an application reference of the application in the data device 126, and allows the data device 126 to distribute the application reference to his/her customers as described in the foregoing embodiments with respect to the first example viral application distribution. In some embodiments, the data device 126 may distribute an entire content or code of an application to a recipient device (e.g., device 104-1), for example, through a radio communication channel such as Bluetooth or WiFi. This allows a recipient device which does not have Internet access capability or a recipient device whose user does not want to access the Internet because of a fee to download and install the application.

Although the data device 126 is described to be located in a specific geographical location, the present disclosure is not limited thereto. In one embodiment, the data device 126 may include one or more networked devices that are deployed at one or more different geographical locations. The one or more networked devices may be connected and communicate with one another through a network. In some embodiments, the user of the first device 104-1 may plant the information of the application 116 to a networked device at a first geographical location at a first time. The user of the second device 104-2 may, on the other hand, receive the information of the application 116 from another networked device located at a second geographical location different from the first geographical location at a second time, which is later than the first time. The information of the application 116 may be communicated among the networked devices at different geographical locations.

Alternative Embodiments

Although the above embodiments describe viral application distribution to be one-to-one interaction, the disclosed system/method can also allow one-to-many interaction. For example, a user may identify a group of recipients and may initiate distribution of an application to the group. This distribution of the application may be an aggregation of one-to-one distribution between the user and one of the recipients. Alternatively, this would be performed virally as well, in that, a first device may transmit information of an application and/or the application to a second device, which in turn transmit the information of the application and/or the application to a third device, and so forth.

Furthermore, a sender may want to share multiple applications in a single transaction. For example, a device of the sender may package multiple application references into a packaged reference and send the packaged references to a device of a recipient. The recipient device may then extract the multiple application references from the packaged reference and display associated information of the multiple applications to the recipient. The recipient may select one or more of the multiple applications and instruct the recipient device to download and/or install the selected applications.

In some embodiments, a recipient of viral application distribution may provide feedback on an application recommended by a sender. The feedback may be posted on an application store of the application and may be used to rank the application and/or the sender (i.e., the recommender of the application).

In another embodiment, a developer of an application may be allowed to specify how and/or what rights/content/relationships are transferred via viral distribution when the application is shared, as opposed to downloading the application freshly from an application store.

Although the marketplace client 124 is described to be a separate application program in the device 104, the marketplace client 124 may alternatively be integrated with an operating platform of the device 104 and/or a browser of the device. Additionally or alternatively, the marketplace client 124 may work cooperatively with an application store with which the marketplace client 124 is associated to locate a compatible version of an application for the device 104. In another embodiment, the marketplace client 124 may simply send information of an application 116 such as identification information of the application to the application store, which finds a compatible version of the application 116 for a device 104 of the marketplace client 124. The application store may then send the compatible version of the application 116 to the marketplace client 124, which in turn displays a result thereof to a user of the device 104. The compatible version of the application 116 can be installed automatically or upon receiving instruction of the user.

In some embodiments, a location associated with the data device 126 may include a virtual location such as a website. A first user 102-1 may plant an application reference of an application to a website associated with the data device 126 using a first device 104-1. In one embodiment, the website may require the first user 102-1 to log in prior to planting the application reference. The data device 126 may detect a presence of a second device 104-2 when a second user 102-2 of the second device 104-2 browses or logs in the website. The data device 126 may then distribute the application reference to the second device 104-2 upon detecting the second device browsing or logging in the website. As described in the foregoing embodiments, the second device 104-2 may include a wish list of applications and may send this wish list to the website or the data device 126 through the website. Upon determining that the application is within the wish list, the data device 126 may distribute the application reference to the second device 104-2 or directly distribute the application (e.g., if the website is an application store having the application) to the second device 104-2.

Exemplary Methods

Exemplary methods for viral application distribution are described with reference to FIGS. 3-6. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 3:
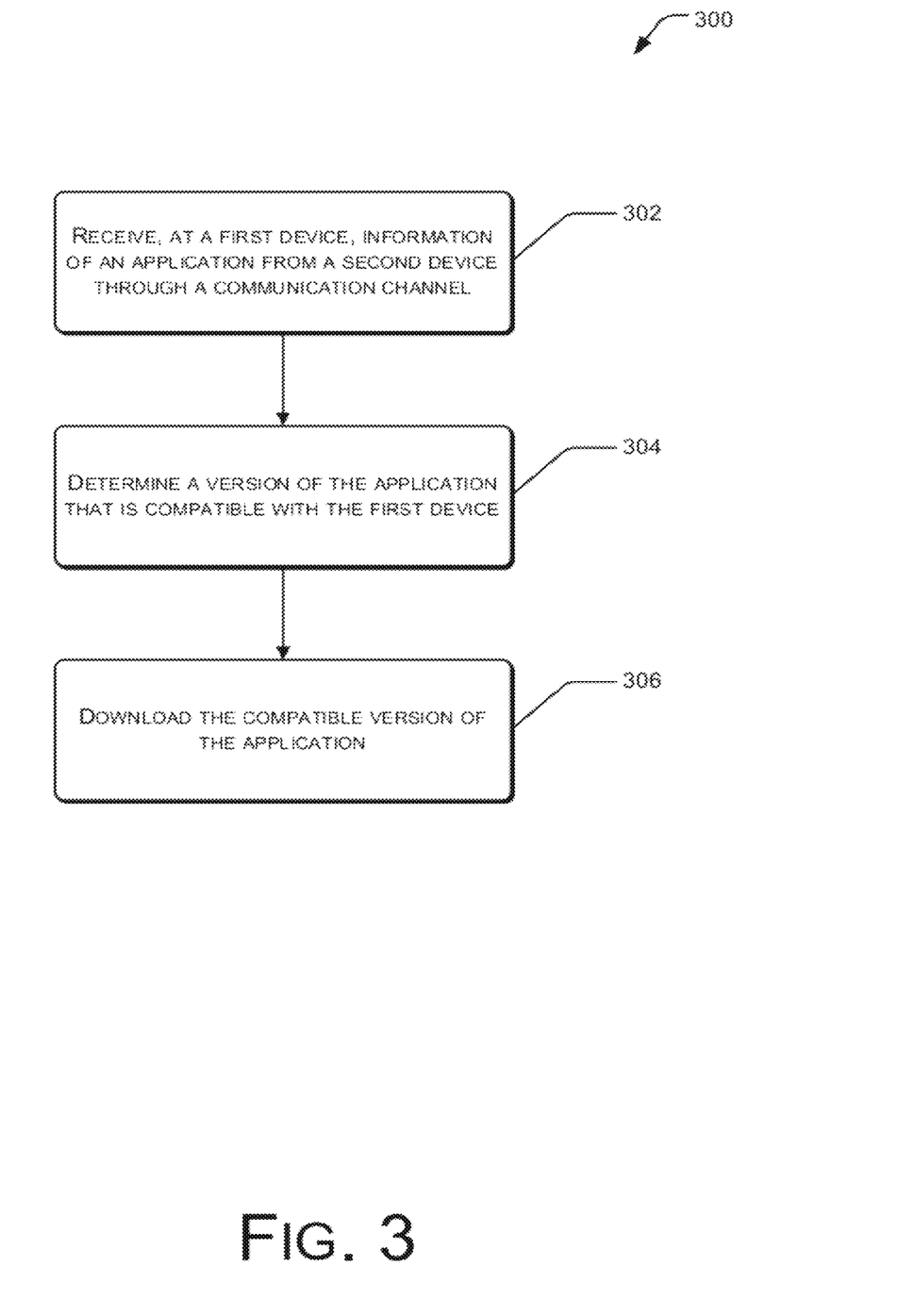
FIG. 3 illustrates a first exemplary method of viral application distribution.

FIG. 3 illustrates a first exemplary method 300 of viral application distribution.

At block 302, a first device receives information of an application from a second device through a communication channel which may be a short-range communication channel, for example. In one embodiment, the information includes identification information of the application. Additionally or alternatively, the information includes no personally identifiable information of the second device.

In some embodiments, the first device may further determine whether the second device is within a predetermined proximity of the first device by detecting whether a tapping/bumping with the second device is received at the first device. Additionally or alternatively, the first device may determine whether the second device is within a predetermined proximity of the first device by determining whether the communication channel is one of predetermined short-range communication channel(s) of the first device for proximal communication.

In some embodiments, in response to determining that the second device is within the predetermined proximity of the first device, the first device receives/accepts the information of the application from the second device without verifying/validating an authenticity of the second device. In another embodiment, in response to determining that the second device is not in the proximity of the first device, the first device verifies the authenticity of the second device, for example, by sending a verification message to the second device. Upon affirmative verification of the authenticity of the second device, the first device receives/accepts the information of the application from the second device. Otherwise, a user of the first device may choose to reject the information of the application, accept the information of the application at a risk, or require further verification of the second device.

At block 304, a version of the application that is compatible with the first device is determined. In one embodiment, the compatible version of the application may be determined by searching a catalog using the identification information of the application. In another embodiment, the first device may first determine whether an operating platform thereof is the same as an operating platform of the second device. Upon determining that the operating platform of the first device is the same as the operating platform of the second device, the first device determines that its compatible version of the application is the same as that of second device, and accepts the identification information of the application without performing a search.

At block 306, upon determining the compatible version of the application, the first device may obtain/download the compatible version of the application. Alternatively, the first device may store information of the compatible version of the application, such as where to obtain the compatible version of the application, and obtain/download the compatible version at a later time.

Optionally, a confirmation code may be received at the first device in response to obtaining the compatible version of the application. The first device may transmit the confirmation code to the second device. A user of the second device may redeem a reward based upon the confirmation code.

Figure 4:
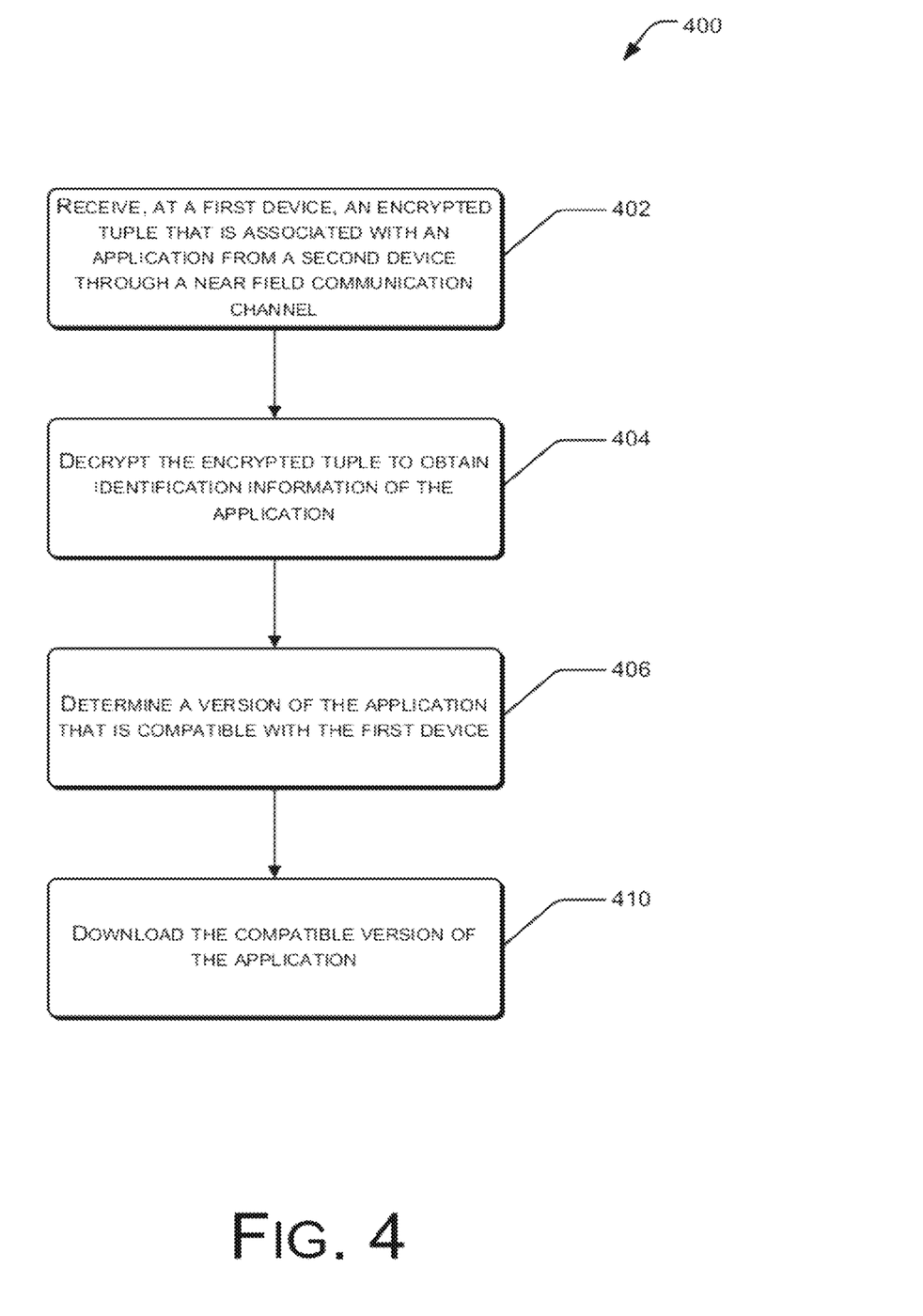
FIG. 4 illustrates a second exemplary method of viral application distribution.

FIG. 4 illustrates a second exemplary method 400 of viral application distribution.

At block 402, a first device receives an encrypted tuple associated with an application from a second device through a short-range communication channel. The encrypted tuple may include identification information of the application. In some embodiments, the encrypted tuple may further include identification information of the second device and/or a user of the second device.

At block 404, the encrypted tuple is decrypted to obtain the identification information of the application. Additionally, the identification information of the second device and/or of the user of the second device may further be obtained when present.

At block 406, a version of the application that is compatible with the first device is determined. In one embodiment, the compatible version of the application is determined by searching a catalog to find a match for the first device using the identification information of the application.

At block 408, the first device obtains/downloads the compatible version of the application.

Figure 5:
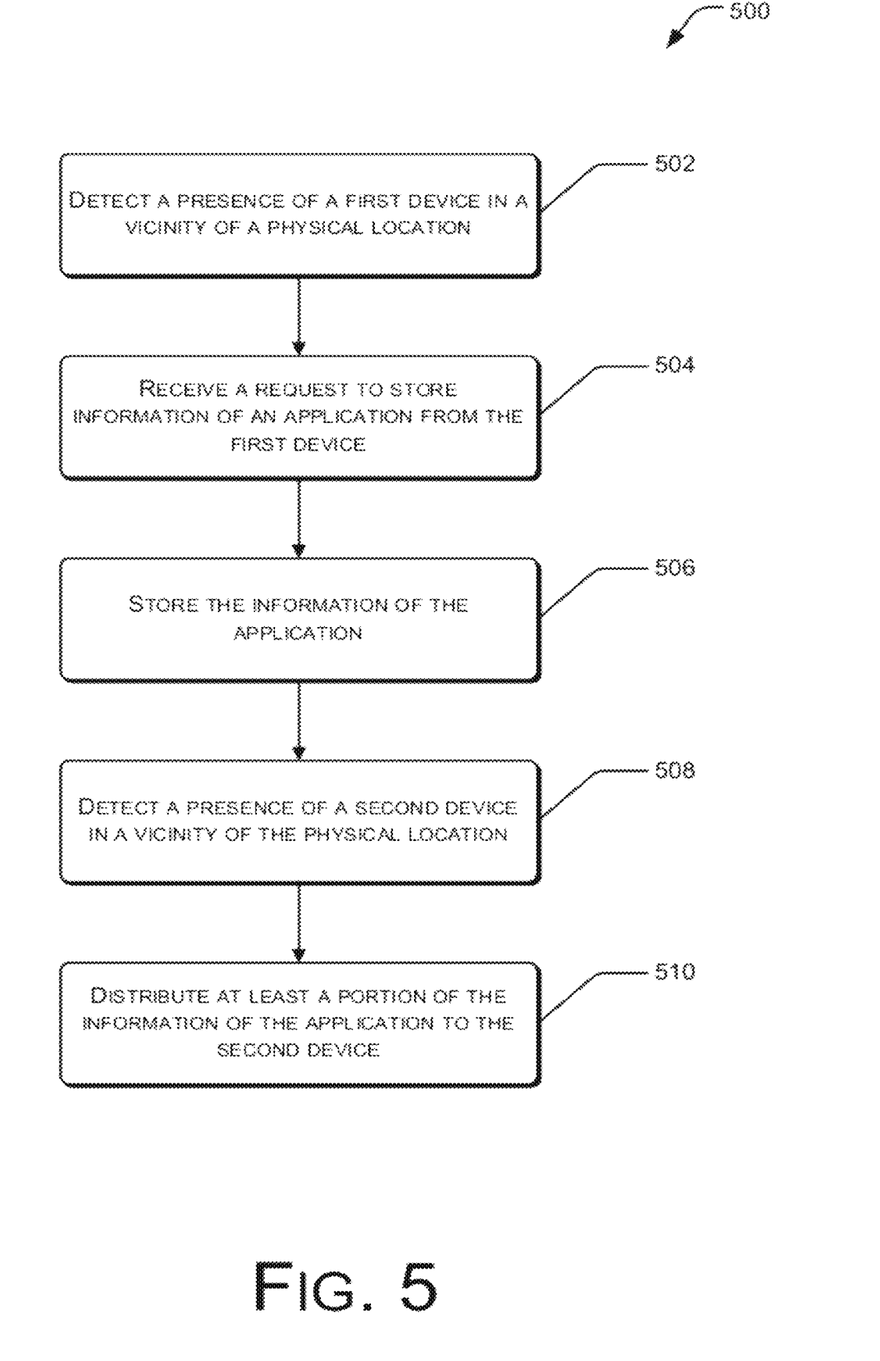
FIG. 5 illustrates a third exemplary method of viral application distribution.

FIG. 5 illustrates a third exemplary method 500 of viral application distribution.

At block 502, a data device detects a presence of a first device in a vicinity of a location associated with the data device at a first time. The data device may detect the presence of the first device based upon a tapping/bumping between the data device (or a detector in the location) and the first device. Additionally or alternatively, the data device may detect the presence of the first device based upon the presence of the first device in a network such as a short-range communication channel. The data device may be located proximally at the location, or may be remote from the location and remotely communicate with a detector or other networked device in the location.

At block 504, the data device receives a request to store information of an application from the first device. In one embodiment, the information of the application may include an encrypted tuple comprising identification information of the application. Additionally, the encrypted tuple may further comprise identification information of the first device or a user of the first device. In another embodiment, the information of the application may include a URI usable by other device to identify the application and to find or download the application. Additionally or alternatively, the information of the application may include content or executable code of the application. In some embodiments, the information of the application includes no personally identifiable information of the first device and/or the user of the first device.

At block 506, the data device stores the information of the application. Additionally or alternatively, the data device may store the content or executable code of the application when present. In one embodiment, prior to storing the information of the application, the data device may determine whether the information of the application includes any malicious code. Upon verifying that the information of the application to be free of malicious code, the data device stores the information of the application.

At block 508, the data device detects a presence of a second device in a vicinity of the location at a second time, which is later than the first time.

At block 510, in response to detecting the presence of the second device, the data device may distribute at least a portion of the information of the application to the second device.

Figure 6:
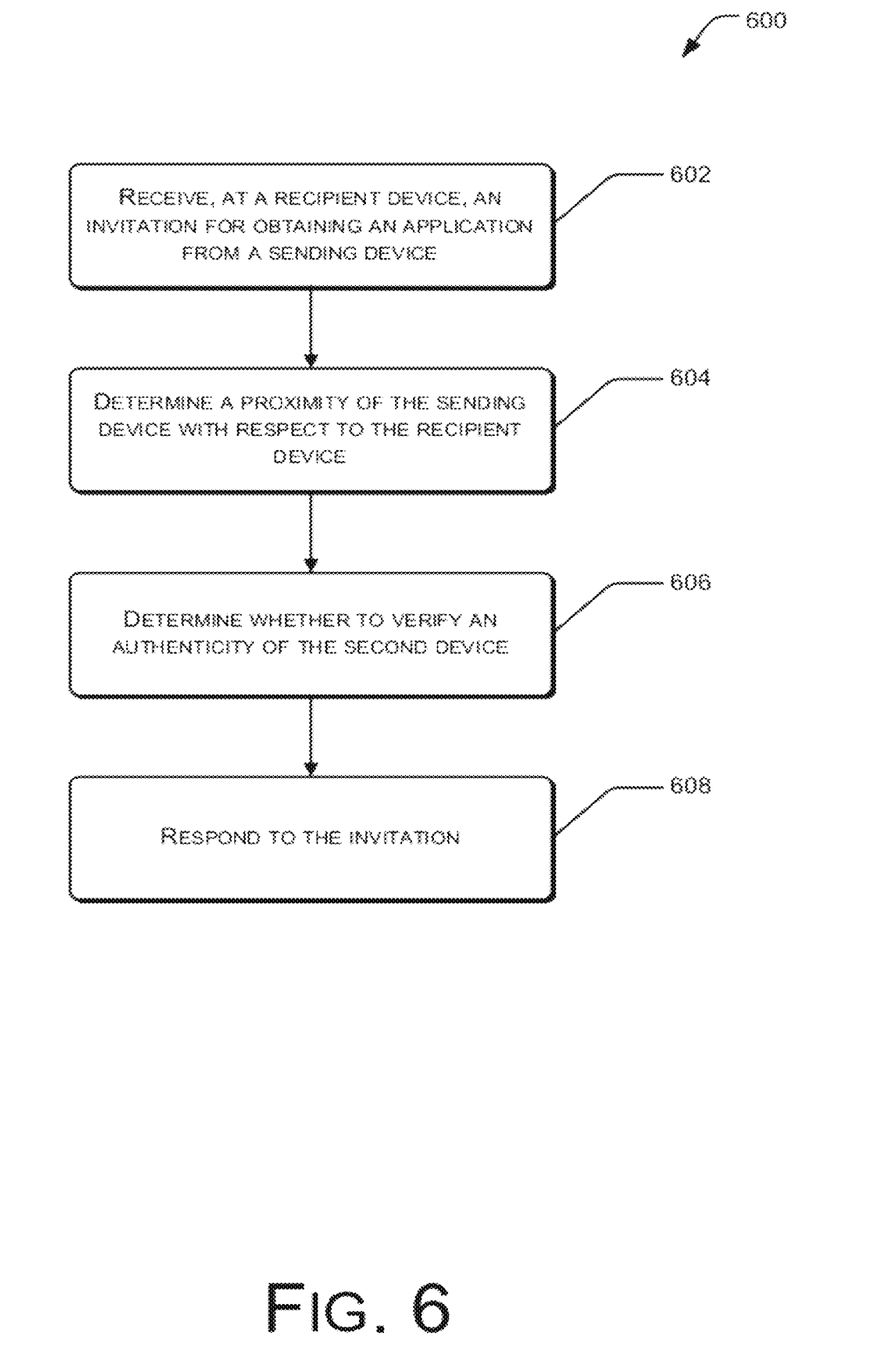
FIG. 6 illustrates a fourth exemplary method of viral application distribution.

FIG. 6 illustrates a fourth exemplary method 600 of viral application distribution.

At block 602, a recipient device receives an invitation for obtaining an application from a sending device. The invitation may include an application reference associated with the application. In one embodiment, the application reference may include an encrypted tuple comprising identification information of the application and identification information of the sending device and/or a user of the sending device. In another embodiment, the application reference may include identification information of the application without including any personally identifiable information of the sending device and/or the user of the sending device. Additionally or alternatively, the application reference may include a URI usable by any recipient device to identify the application and to find or download the application.

At block 604, a proximity of the sending device with respect to the recipient device is determined. In one embodiment, the proximity of the sending device may be determined based upon whether a tapping/bumping is received at the recipient device with the sending device. Additionally or alternatively, the proximity of the sending device may be determined based upon determining a type of communication channel between the recipient and the sending device. For example, upon determining that the type of communication channel is a short-range communication channel such as infrared communication, the sending device is determined to be within a predetermined proximity of the recipient device.

At block 606, the first device determines whether to verify an authenticity of the sending device based at least upon the determined proximity of the sending device. This determination may be done automatically or manually upon request of a user of the first device.

At block 608, the user of the first device responds to the invitation. The user of the first device may download the application based upon the application reference, store the application reference for later download, or reject to download the application.

Any of the acts of any of the methods described herein may be implemented at least partially by a processor or other electronic device based on instructions stored on one or more computer-readable media. Computer-readable media can be any available media that can be accessed during viral application distribution. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A computer-implemented method for viral distribution, comprising:
   storing, on a first device, a marketplace client that is used by the first device to select versions of applications that are compatible with the first device;
   receiving, at the first device, information of an application from a second device through a predetermined short-range communication channel set by the first device, the information comprising identification information of the application wherein the identification information is used by the first device to select a version of the application that is compatible with the first device;
   selecting, by the first device using the marketplace client stored on the first device, the version of the application that is compatible with the first device based at least upon searching a specific catalog from a plurality of catalogs provided by the marketplace client, based at least partly on an association of the specific catalog with an operating system of the first device, using the identification information of the application; and obtaining, at the first device and at least partly in response to the determining, the compatible version of the application.

2. The computer-implemented method as recited in claim 1, further comprising determining whether the second device is in a proximity of the first device by detecting a bumping at the first device with the second device.

3. The computer-implemented method as recited in claim 1, wherein receiving the information of the application comprises:
   detecting, at the first device, a bumping with the second device; and
   in response to detecting the bumping with the second device, receiving the information of the application from the second device through the predetermined short-range communication channel.

4. The computed-implemented method as recited in claim 1, further comprising:
   in response to obtaining the compatible version of the application, receiving a confirmation code at the first device; and
   sending the confirmation code to the second device for redeeming a reward by a user of the second device.

5. The computer-implemented method as recited in claim 1, wherein the compatible version of the application is obtained, at the first device, by selection of a received uniform resource identifier usable to identify the compatible version of the application stored in the specific catalog by a data device.

6. The computer-implemented method as recited in claim 1, wherein:
   the information of the application is received before the obtaining of the compatible version of the application; and
   the information of the application omits personally identifiable information of the second device.

7. The computer-implemented method as recited in claim 1, wherein the information of the application omits information identifying a version or a platform of the application that is installed on the second device.

8. A computer-implemented method for viral distribution, comprising:
   storing, on a first device, a marketplace client that is used by the first device to select versions of applications that are compatible with the first device;
   receiving, at the first device from a second device through a predetermined short-range communication channel set by the first device, information associated with an application, the information comprising at least:
      identification information of the application, wherein the identification information is for selecting a version of the application that is compatible with the first device; and
      identification information of the second device;
   selecting, by the first device using the marketplace client stored on the first device, the version of the application that is compatible with the first device based at least upon searching a catalog provided by the marketplace client using the identification information of the application;
   obtaining, at the first device and at least partly in response to the determining, the compatible version of the application, and
   sending the identification information of the second device to an application store or website facilitating rewarding a user of the second device.

9. The computer-implemented method as recited in claim 8, further comprising:
   determining that the second device is in a proximity of the first device by:
      detecting at the first device, a bumping with the second device; or
      determining that the predetermined short-range communication channel is one of one or more predetermined short-range communication channels of the first device for proximal communication; and
   in response to determining that the second device is in the proximity of the first device, receiving the information associated with the application from the second device without verifying an authenticity of the second device.

10. The computer-implemented method as recited in claim 8, wherein receiving the information associated with the application comprises:
   detecting, at the first device, a bumping with the second device; and
   in response to detecting the bumping with the second device, receiving the information associated with the application from the second device through the predetermined short-range communication channel.

11. The computer-implemented method as recited in claim 8, further comprising incorporating, based at least in part on obtaining the compatible version of the application, the identification information of the second device into the compatible version of the application.

12. The computer-implemented method as recited in claim 11, wherein the application comprises a networked application, the identification information of the second device comprises account information of the user of the second device, and the incorporating comprises the networked application recognizing the user of the second device based on the account information.

13. The computer-implemented method as recited in claim 8, wherein the rewarding the user of the second device comprises providing a credit to the application store or website.

14. A computer-implemented method of viral application distribution, comprising:
   detecting, at a first time, a presence of a first mobile device in a vicinity of a location associated with a data device;
   receiving, at the data device and from the first mobile device, a request to store information of an application and information associated with the vicinity of the location, the information of the application comprising at least one of:
      a thumbnail image of the application; or
      a barcode of the application;
   storing, at the data device, the information of the application and the information associated with the vicinity of the location;
   detecting, at a second time, a presence of a second mobile device in the vicinity of the location, wherein the second time is later than the first time; and
   based at least in part on detecting the presence of the second mobile device in the vicinity of the location associated with the data device, distributing, by the data device, at least a portion of the information of the application received from the first mobile device at the first time to the second mobile device.

15. The computer-implemented method as recited in claim 14, further comprising:

storing information of the first mobile device, the information of the first mobile device comprising at least a buddy list stored in the first mobile device; and determining that the second mobile device is represented in the buddy list prior to distributing the at least the portion of the information of the application to the second mobile device.

16. The computer-implemented method as recited in claim 14, further comprising:

receiving, from the second mobile device, a wish list of applications; and determining that the application is represented within the wish list of applications prior to distributing the at least the portion of the information of the application to the second mobile device.

17. The computer-implemented method as recited in claim 14, wherein the information of the application further comprises a Uniform Resource Identifier (URI) of the application usable by the second mobile device to obtain a compatible version of the application from an application store.

18. The computer-implemented method as recited in claim 14, wherein the information of the application comprises no personally identifiable information of the first mobile device.

19. The computer-implemented method as recited in claim 14, wherein the information of the application comprises an encrypted tuple associated with the application, the encrypted tuple comprising identification information of the application and identification information of the first mobile device, and wherein the method further comprises decrypting the encrypted tuple to obtain the identification information of the application and the identification information of the first mobile device.

20. The computer-implemented method as recited in claim 14, wherein the data device is a detector or kiosk located in the vicinity of the location.

* * * * *